United States Patent
Kouno et al.

(10) Patent No.: US 12,281,195 B2
(45) Date of Patent: *Apr. 22, 2025

(54) EPOXY RESIN COMPOSITION, GAS BARRIER FILM, AND LAMINATE

(71) Applicant: MITSUBISHI GAS CHEMICAL COMPANY, INC., Tokyo (JP)

(72) Inventors: Kazuki Kouno, Kanagawa (JP); Ryoma Hashimoto, Kanagawa (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 361 days.

This patent is subject to a terminal disclaimer.

(21) Appl. No.: 17/634,431

(22) PCT Filed: Jul. 13, 2020

(86) PCT No.: PCT/JP2020/027176
§ 371 (c)(1),
(2) Date: Feb. 10, 2022

(87) PCT Pub. No.: WO2021/029170
PCT Pub. Date: Feb. 18, 2021

(65) Prior Publication Data
US 2022/0315694 A1   Oct. 6, 2022

(30) Foreign Application Priority Data

Aug. 14, 2019  (JP) .................... 2019-148906

(51) Int. Cl.
| | |
|---|---|
| C08G 59/50 | (2006.01) |
| B32B 7/12 | (2006.01) |
| B32B 27/08 | (2006.01) |
| B32B 27/32 | (2006.01) |
| B32B 27/36 | (2006.01) |
| C08G 59/28 | (2006.01) |
| C08K 3/22 | (2006.01) |

(52) U.S. Cl.
CPC ............ *C08G 59/5033* (2013.01); *B32B 7/12* (2013.01); *B32B 27/08* (2013.01); *B32B 27/32* (2013.01); *B32B 27/36* (2013.01); *C08G 59/28* (2013.01); *C08K 3/22* (2013.01); *B32B 2255/10* (2013.01); *B32B 2255/20* (2013.01); *B32B 2255/26* (2013.01); *B32B 2255/28* (2013.01); *B32B 2307/7244* (2013.01); *B32B 2307/748* (2013.01); *C08K 2003/2227* (2013.01)

(58) Field of Classification Search
CPC ...... C08G 59/5033; C08G 59/28; B32B 7/12; B32B 27/08; B32B 27/32; B32B 27/36; B32B 2255/10; B32B 2255/26; B32B 2255/28; B32B 2307/7244; C08K 3/22; C08K 2003/2227

See application file for complete search history.

(56) References Cited

U.S. PATENT DOCUMENTS

| | | | |
|---|---|---|---|
| 4,264,758 A | 4/1981 | Waddill | |
| 4,331,582 A | 5/1982 | Babayan | |
| 11,814,471 B2* | 11/2023 | Kouno | C08J 7/048 |
| 2005/0014908 A1 | 1/2005 | Kutsuna et al. | |
| 2008/0311525 A1* | 12/2008 | Gries | G03F 7/092 |
| | | | 430/309 |
| 2014/0192501 A1 | 7/2014 | Kotake et al. | |
| 2015/0059295 A1 | 3/2015 | Honda et al. | |
| 2015/0082747 A1 | 3/2015 | Honda et al. | |
| 2015/0368503 A1* | 12/2015 | Sasaki | B05D 7/50 |
| | | | 427/407.1 |
| 2020/0071515 A1 | 3/2020 | Kouno | |
| 2022/0227991 A1* | 7/2022 | Mayer | C08L 63/00 |

FOREIGN PATENT DOCUMENTS

| | | |
|---|---|---|
| CN | 1551910 | 12/2004 |
| JP | 2003-300271 A | 10/2003 |
| JP | 2005-002353 A | 1/2005 |
| JP | 2005-28835 A | 2/2005 |
| JP | 2007-126627 A | 5/2007 |
| JP | 2009-101684 A | 5/2009 |
| JP | 2010-202753 A | 9/2010 |
| JP | 2013-203023 A | 10/2013 |
| JP | 2016-097596 A | 5/2016 |
| WO | 2013/161480 A1 | 10/2013 |
| WO | 2013/161481 A | 10/2013 |
| WO | 2017/106596 A1 | 6/2017 |
| WO | 2017/179359 A1 | 10/2017 |
| WO | 2018/105282 A1 | 6/2018 |

OTHER PUBLICATIONS

Machine Translation of Otsuka et al. JP 2005002353 A (Year: 2005).*
International Search Report and Written Opinion of the International Searing Authority issued in International Patent Application No. PCT/JP2020/027176, dated Sep. 29, 2020, along with an English translation thereof.

* cited by examiner

*Primary Examiner* — Callie E Shosho
*Assistant Examiner* — Bethany M Miller
(74) *Attorney, Agent, or Firm* — GREENBLUM & BERNSTEIN P.L.C.

(57) ABSTRACT

Provided is an epoxy resin composition including an epoxy resin, an epoxy resin curing agent containing an amine-based curing agent, and an acidic compound, wherein a ratio (basic nitrogen/acid groups) of a molar equivalent of basic nitrogen in the epoxy resin composition to a molar equivalent of acid groups derived from the acidic compound is from 0.10 to 3.0. Also provided are a gas barrier film and a laminate in which the epoxy resin composition is used.

14 Claims, 3 Drawing Sheets

EPOXY RESIN COMPOSITION, GAS BARRIER FILM, AND LAMINATE

TECHNICAL FIELD

The present invention relates to an epoxy resin composition, and a gas barrier film and laminate in which the epoxy resin composition is used.

BACKGROUND ART

Packaging materials used for food products, pharmaceuticals, cosmetics, precision electronic components, and the like require high oxygen barrier properties and water vapor barrier properties to prevent deterioration of the contents.

Oxygen barrier properties of thermoplastic films are typically not so high, and thus means for imparting gas barrier properties to the films have been studied, including a method for forming a gas barrier layer of various types, such as a polyvinylidene chloride (PVDC) layer or a polyvinyl alcohol (PVA) layer, and a method for vapor-depositing an inorganic substance, such as alumina ($Al_2O_3$) or silica ($SiO_2$).

Films having a PVDC layer formed as a gas barrier layer are transparent and exhibit good barrier properties. However, when incinerated as general wastes, those films may generate organic substances, such as acid gases, and thus a transition to other materials is desired due to environmental concerns. Films in which a PVA layer is formed exhibit excellent gas barrier properties under low humidity but are highly hygroscopic, causing a problem in that the gas barrier properties rapidly decreases at a relative humidity of approximately 70% or higher.

An inorganic vapor-deposited film, which is a thermoplastic film on which an inorganic substance, such as alumina or silica, is vapor-deposited, is transparent and has good gas barrier properties, and does not cause such problems described above. However, in bending the inorganic vapor-deposited film, cracks are generated in the vapor-deposited inorganic layer, causing a problem of significant reduction of the gas barrier properties.

As a method for improving the bending resistance of the gas barrier film or laminate including a layer on which an inorganic substance is vapor-deposited, a method for forming a layer made from a cured product of an epoxy resin composition containing a predetermined epoxy resin and a predetermined amine-based curing agent as a main component has been proposed (Patent Documents 1 to 3).

Furthermore, Patent Document 4 discloses a gas barrier film having a certain layer structure that includes a substrate film having vapor-deposited inorganic layer and a cured resin layer, the cured resin layer including a cured product of an epoxy resin composition containing an epoxy resin, a certain epoxy resin curing agent, and non-spherical inorganic particles. This gas barrier film exhibits improved gas barrier properties and has bending resistance better than known gas barrier films having a vapor-deposited inorganic layer.

Improving epoxy resin compositions for use in gas barrier films are investigated to enhance the various functions of the gas barrier films to be obtained. For example, Patent Document 5 discloses a gas barrier resin composition containing an epoxy resin, an epoxy resin curing agent, and a specific curing accelerator, and also containing a prescribed amount of a predetermined amine-derived skeletal structure in a cured product that is to be formed, and indicates that the gas barrier resin composition exhibits high gas barrier properties in a wide range of curing conditions.

As described above, forming a gas barrier layer including a cured product of a predetermined epoxy resin composition on a substrate is known to enhance the improving effect of the gas barrier properties.

Furthermore, in a gas barrier film having a laminated structure, or a gas barrier laminate, it is important that interlayer adhesiveness should be high to achieve good gas barrier properties stably. In this regard, for example, Patent Document 6 describes that in a laminate film obtained by laminating at least a substrate, a primer layer, an adhesive layer, and a sealant layer in this order, using a primer composition containing a specific polyester resin to form the primer layer, and using an adhesive containing an epoxy resin composition as a main component to form the adhesive layer enable to produce a laminate film that excels in adhesiveness over time and maintains excellent laminate strength and heat seal strength even when stored for a long period of time.

CITATION LIST

Patent Documents

Patent Document 1: JP 2003-300271 A
Patent Document 2: JP 2005-028835 A
Patent Document 3: JP 2009-101684 A
Patent Document 4: WO 2018/105282
Patent Document 5: JP 2010-202753 A
Patent Document 6: JP 2013-203023 A

SUMMARY OF INVENTION

Technical Problem

However, depending on the type of substrate and epoxy resin composition used in the gas barrier film or laminate, the interlayer adhesiveness between the substrate and the cured product layer of the epoxy resin composition is not sufficient. Patent Documents 1 to 6 each disclose an epoxy resin composition in which an amine-based epoxy resin curing agent is used, but according to research by the present inventors in recent years, it has been discovered that the adhesiveness to inorganic substances, and particularly to alumina, of the cured product of an epoxy resin composition in which an amine-based epoxy resin curing agent is used is unstable.

Thus, an object of the present invention is to provide an epoxy resin composition that contains an amine-based curing agent as an epoxy resin curing agent, and enables to form a cured product that exhibits high gas barrier properties and excels in adhesiveness to inorganic substances such as alumina, and to provide a gas barrier film and laminate in which the epoxy resin composition is used.

Solution to Problem

The present inventors have discovered that with respect to an epoxy resin composition containing an epoxy resin, an epoxy resin curing agent including an amine-based curing agent, and an acidic compound, the problems described above can be solved by setting a ratio between a molar equivalent of basic nitrogen in the epoxy resin composition and a molar equivalent of an acid group derived from the acidic compound to a predetermined range.

That is, the present invention relates to the following.

[1] An epoxy resin composition including:
an epoxy resin;
an epoxy resin curing agent containing an amine-based curing agent; and
an acidic compound,
wherein a ratio (basic nitrogen/acid groups) of a molar equivalent of basic nitrogen in the epoxy resin composition to a molar equivalent of acid groups derived from the acidic compound is from 0.10 to 3.0.

[2] The epoxy resin composition according to [1], having a pH at 25° C. of 7.5 or less.

[3] The epoxy resin composition according to [1] or [2], wherein the epoxy resin has, as a main component, an epoxy resin having a glycidylamino group derived from meta-xylylenediamine.

[4] The epoxy resin composition according to any one of [1] to [3], wherein the amine-based curing agent is the following amine-based curing agent (i):
(i) A reaction product between a component (A) and a component (B) below:
(A) at least one selected from the group consisting of meta-xylylenediamine and para-xylylenediamine;
(B) at least one selected from the group consisting of unsaturated carboxylic acids represented by Formula (1) below and derivatives thereof,

[Chem. 1]

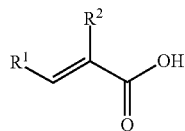

(1)

in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

[5] The epoxy resin composition according to any one of [1] to [4], wherein the acidic compound is at least one compound selected from the group consisting of a sulfonic acid compound, a carboxylic acid compound, and a phosphoric acid compound.

[6] The epoxy resin composition according to any one of [1] to [5], wherein the acidic compound has an acid value from 200 to 650 mgKOH/g.

[7] The epoxy resin composition according to any one of [1] to [6], wherein the acidic compound is a monovalent acid.

[8] The epoxy resin composition according to any one of [1] to [7], further containing a non-spherical inorganic particle.

[9] The epoxy resin composition according to any one of [1] to [8], wherein a ratio of the number of active amine hydrogens in the epoxy resin curing agent to the number of epoxy groups in the epoxy resin is more than 1.0 and 5.0 or less.

[10] A gas barrier film including: a substrate having at least one surface constituted of the inorganic substance; and a cured resin layer, wherein the cured resin layer is a cured product of the epoxy resin composition described in any one of [1] to [9].

[11] The gas barrier film according to [10], wherein the inorganic substance constituting the substrate is at least one selected from the group consisting of silicon oxide, aluminum, and aluminum oxide.

[12] The gas barrier film according to [10] or [11], wherein the surface of the substrate constituted of the inorganic substance is adjacent to the cured resin layer.

[13] The gas barrier film according to any one of [10] to [12], containing the substrate having only one surface constituted of the inorganic substance, and only one cured resin layer.

[14] A laminate including: the gas barrier film described in any one of [10] to [13]; and a thermoplastic resin layer.

Advantageous Effects of Invention

According to the epoxy resin composition of the present invention, a cured product having high gas barrier properties, and having good adhesion to inorganic substances such as alumina in particular can be formed. A gas barrier film and laminate having a cured resin layer formed on a substrate having at least one surface constituted of an inorganic substance, the cured resin layer being a cured product of the epoxy resin composition, exhibit high gas barrier properties and interlayer adhesiveness, and are suitable for packaging material applications, for example.

DESCRIPTION OF EMBODIMENTS

Epoxy Resin Composition

Figure 1:
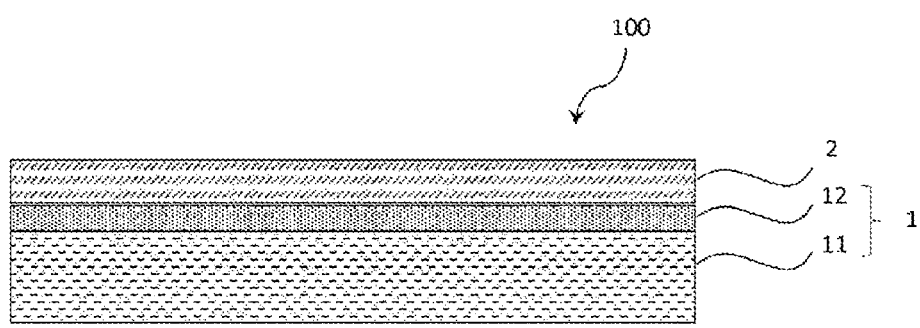
FIG. 1 is a cross-sectional schematic view illustrating a gas barrier film according to an embodiment of the present invention.

The epoxy resin composition of the present invention is an epoxy resin composition including an epoxy resin, an epoxy resin curing agent containing an amine-based curing agent, and an acidic compound, and is characterized in that a ratio of (basic nitrogen/acid groups) is from 0.10 to 3.0, which is a ratio of a molar equivalent of basic nitrogen in the epoxy resin composition to a molar equivalent of acid groups derived from the acidic compound.

By having the above configuration, the epoxy resin composition of the present invention can form a cured product having high gas barrier properties and good adhesion to inorganic substances such as alumina in particular. The reason for this is not clear but is assumed to be as follows.

According to research by the present inventors in recent years, it was discovered that the adhesiveness of a cured product of an epoxy resin composition to inorganic substances, and particularly alumina, is unstable, and among such cured products, this tendency is remarkable when an amine-based epoxy resin curing agent is used. As a result of diligent research, the present inventors have discovered that by adding a predetermined amount of an acidic compound to an epoxy resin composition in which an amine-based epoxy resin curing agent is used, the amine in the epoxy resin composition is neutralized, and the adhesiveness of the obtained cured product to inorganic substances such as alumina is improved. In particular, since an inorganic substance containing an amphoteric metal such as aluminum or alumina is easily corroded by an acid and alkali, it is hypothesized that corrosion is suppressed by the neutralization effect from the addition of an acidic compound to the epoxy resin composition, and thereby an adhesiveness improving effect is better achieved.

Herein, the "molar equivalent of basic nitrogen in the epoxy resin composition" means the molar equivalent of basic nitrogen derived from primary to tertiary amines in the epoxy resin composition as determined by measuring the total amine value, and the basic nitrogen includes not only the basic nitrogen derived from primary to tertiary amines in the amine-based curing agent, but also, for example, the basic nitrogen derived from primary to tertiary amines in the epoxy resin. Specifically, the molar equivalent of the basic nitrogen in the epoxy resin composition can be measured by the method described in the examples. Furthermore, the "molar equivalent of acid groups derived from the acidic compound" means the molar equivalent of proton-releasing groups of the acidic compound blended in the epoxy resin composition.

Examples of the proton-releasing groups include sulfonic acid groups, carboxy groups, and phosphoric acid groups.

From the viewpoint of forming a cured product with good adhesion to an inorganic substance, the ratio (basic nitrogen/acid group) of the molar equivalent of basic nitrogen in the epoxy resin composition of the present invention to the molar equivalent of acid groups derived from the acidic compound is 3.0 or less, preferably 2.5 or less, more preferably 2.0 or less, even more preferably 1.5 or less, and yet even more preferably 1.0 or less. Furthermore, from the viewpoints of forming a cured product with good adhesion to inorganic substances and maintaining high gas barrier properties, the ratio thereof is 0.10 or more, preferably 0.20 or more, more preferably 0.30 or more, even more preferably 0.40 or more, and yet even more preferably 0.50 or more.

The molar equivalent ratio (basic nitrogen/acid group) in the epoxy resin composition can be specifically determined by the method described in the examples.

From the viewpoint of forming a cured product with good adhesion to inorganic substances such as alumina, the pH of the epoxy resin composition at 25° C. is preferably 7.5 or less, more preferably 7.2 or less, and even more preferably 7.0 or less, and is preferably 3.5 or more, more preferably 4.0 or more, and even more preferably 4.5 or more The pH of the epoxy resin composition at 25° C. can be measured specifically by the method described in the examples.

Each component contained in the epoxy resin composition of the present invention will be described.

Epoxy Resin

The epoxy resin used in the epoxy resin composition of the present invention may be a saturated or unsaturated aliphatic compound or alicyclic compound, an aromatic compound, or a heterocyclic compound, but in consideration of the manifestation of high gas barrier properties, an epoxy resin containing an aromatic ring or an alicyclic structure in the molecule is preferable.

Specific examples of the epoxy resin include at least one resin selected from epoxy resins having a glycidylamino group derived from meta-xylylenediamine, epoxy resins having a glycidylamino group derived from para-xylylenediamine, epoxy resins having a glycidylamino group derived from 1,3-bis(aminomethyl) cyclohexane, epoxy resins having a glycidylamino group derived from 1,4-bis(aminomethyl) cyclohexane, epoxy resins having a glycidylamino group derived from diaminodiphenylmethane, epoxy resins having a glycidylamino group and/or a glycidyloxy group derived from a para-aminophenol, epoxy resins having a glycidyloxy group derived from bisphenol A, epoxy resins having a glycidyloxy group derived from bisphenol F, epoxy resins having a glycidyloxy group derived from a phenol novolac, and epoxy resins having a glycidyloxy group derived from resorcinol. In order to improve various performance aspects such as flexibility, impact resistance, and moist heat resistance, two or more types of the epoxy resins described above may be mixed at appropriate ratios and used.

Of the abovementioned epoxy resins, from the viewpoint of gas barrier properties, the epoxy resin is preferably one having, as a main component, at least one component selected from the group consisting of an epoxy resin having a glycidylamino group derived from meta-xylylenediamine, an epoxy resin having a glycidylamino group derived from para-xylylenediamine, and an epoxy resin having a glycidyloxy group derived from bisphenol F, and is more preferably one having, as a main component, an epoxy resin having a glycidylamino group derived from meta-xylylenediamine.

Note that "main component" here means that other components may be included within a range that does not depart from the spirit of the present invention, and also means a component that is included in an amount of preferably from 50 to 100 mass %, more preferably from 70 to 100 mass %, and even more preferably from 90 to 100 mass % relative to the total amount.

The epoxy resin is obtained by a reaction of various alcohols, phenols, and amines with an epihalohydrin. For example, an epoxy resin having a glycidylamino group derived from meta-xylylenediamine is obtained by adding epichlorohydrin to meta-xylylenediamine Meta-xylylenediamine has four amino hydrogens, and therefore mono-, di-, tri- and tetraglycidyl compounds are produced. The number of glycidyl groups can be changed by changing the reaction ratio between the meta-xylylenediamine and the epichlorohydrin. For example, an epoxy resin having primarily four glycidyl groups is obtained by carrying out an addition reaction of approximately four-fold moles of epichlorohydrin to meta-xylylenediamine.

The epoxy resin is synthesized by reacting an epihalohydrin with various alcohols, phenols, and amines in the presence of an alkali such as sodium hydroxide at a temperature from 20 to 140° C., preferably at a temperature from 50 to 120° C. in the case of alcohols and phenols, and preferably at a temperature from 20 to 70° C. in the case of amines, and then separating the alkali halide that is produced. For a case in which an epoxy resin having four glycidyl groups is to be primarily obtained, an excess amount of the epihalohydrin is used with respect to the various alcohols, phenols, and amines.

The number average molecular weight of the epoxy resin that is produced differs depending on the molar ratio of the epihalohydrin to the various alcohols, phenols, and amines but is preferably from 100 to 4000, more preferably from 200 to 1000, and even more preferably from 200 to 500.

Epoxy Resin Curing Agent Containing Amine-Based Curing Agent

The epoxy resin curing agent used in the epoxy resin composition of the present invention contains an amine-based curing agent from the viewpoint of achieving high gas barrier properties.

As the amine-based curing agent, a polyamine or a modified product thereof conventionally used as an epoxy resin curing agent can be used. From the viewpoint of obtaining high gas barrier properties, the amine-based curing agent is preferably a polyamine modified product, is more preferably at least one selected from the group consisting of the following amine-based curing agents (i) and amine-based curing agents (ii), and is more preferably the following amine-based curing agent (i):

(i) A reaction product between a component (A) and a component (B) below:
(A) at least one selected from the group consisting of meta-xylylenediamine and para-xylylenediamine;
(B) at least one selected from the group consisting of unsaturated carboxylic acids represented by Formula (1) below and derivatives of the unsaturated carboxylic acids,

[Chem. 2]

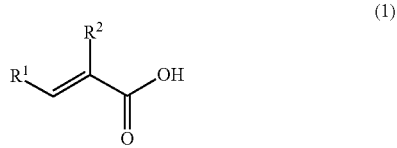

(1)

in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

(ii) A reaction product between epichlorohydrin and at least one selected from the group consisting of meta-xylylenediamine and para-xylylenediamine Amine-Based Curing Agent (i)

The amine-based curing agent (i) is a reaction product between the component (A) and the component (B) below:
(A) at least one selected from the group consisting of meta-xylylenediamine and para-xylylenediamine;
(B) at least one selected from the group consisting of unsaturated carboxylic acids represented by Formula (1) below and derivatives of the unsaturated carboxylic acids:

[Chem. 3]

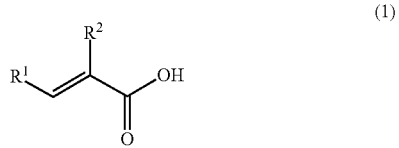

(1)

in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

The component (A) is used from the viewpoint of gas barrier properties, and meta-xylylenediamine is preferable in terms of the gas-barrier property. One component (A) may be used alone, or two of the components (A) may be mixed and used.

The component (B) is at least one selected from the group consisting of unsaturated carboxylic acids represented by Formula (1) and derivatives thereof, and from the viewpoint of gas-barrier properties, in Formula (1), $R^1$ is preferably a hydrogen atom or an alkyl group having from 1 to 8 carbons, more preferably a hydrogen atom or an alkyl group having from 1 to 3 carbons, even more preferably a hydrogen atom or a methyl group, and yet even more preferably a hydrogen atom.

Moreover, from the viewpoint of gas-barrier properties, in Formula (1), $R^2$ is preferably a hydrogen atom or an alkyl group having from 1 to 8 carbons, more preferably a hydrogen atom or an alkyl group having from 1 to 3 carbons, even more preferably a hydrogen atom or a methyl group, and yet even more preferably a hydrogen atom.

Examples of the derivatives of the unsaturated carboxylic acids represented by Formula (1) include esters, amides, acid anhydrides, and acid chlorides of the unsaturated carboxylic acids. The ester of the unsaturated carboxylic acid is preferably an alkyl ester, and in terms of obtaining good reactivity, the alkyl has preferably from 1 to 6 carbons, more preferably from 1 to 3 carbons, and even more preferably from 1 to 2 carbons.

Examples of the unsaturated carboxylic acids represented by Formula (1) above and the derivatives thereof include unsaturated carboxylic acids, such as acrylic acid, methacrylic acid, α-ethylacrylic acid, α-propylacrylic acid, α-isopropylacrylic acid, α-n-butylacrylic acid, α-t-butylacrylic acid, α-pentylacrylic acid, α-phenylacrylic acid, α-benzylacrylic acid, crotonic acid, 2-pentenoic acid, 2-hexenoic acid, 4-methyl-2-pentenoic acid, 2-heptenoic acid, 4-methyl-2-hexenoic acid, 5-methyl-2-hexenoic acid, 4,4-dimethyl-2-pentenoic acid, 4-phenyl-2-butenoic acid, cinnamic acid, o-methyl cinnamic acid, m-methyl cinnamic acid, p-methyl cinnamic acid, and 2-octenoic acid; and esters, amides, acid anhydrides, and acid chlorides of these unsaturated carboxylic acids.

Among the above, in terms of obtaining good gas barrier properties, the component (B) is preferably at least one selected from the group consisting of acrylic acid, methacrylic acid, crotonic acid, and derivatives of these acids, and more preferably at least one selected from the group consisting of acrylic acid, methacrylic acid, crotonic acid, and alkyl esters of these acids, even more preferably at least one selected from the group consisting of acrylic acid, methacrylic acid, and alkyl esters of these acids, still more preferably alkyl esters of acrylic acid, and still even more preferably methyl acrylate.

One component (B) may be used alone, or two or more in combination may be used.

When an unsaturated carboxylic acid, an ester, or an amide is used as the component (B), the reaction between the component (A) and the component (B) is carried out by mixing the component (A) and the component (B) under a temperature condition of from 0 to 100° C. and more preferably from 0 to 70° C., and then carrying out, at a temperature condition of from 100 to 300° C. and preferably from 130 to 250° C., a Michael addition reaction and an amide group formation reaction by dehydration, de-alcoholization, and deamination.

In this case, in the amide group formation reaction, to complete the reaction, the pressure inside a reaction device can be reduced at the final stage of the reaction as necessary. In addition, a non-reactive solvent can be used to dilute as necessary. Furthermore, a catalyst, such as a phosphite ester, can be added as a dehydrating agent or a dealcoholizing agent.

On the other hand, when an acid anhydride or an acid chloride of an unsaturated carboxylic acid is used as the component (B), the reaction is performed by mixing the component (A) and the component (B) under conditions of 0 to 150° C. and preferably 0 to 100° C., and then performing Michael addition reaction and the amide group formation reaction. In this case, in the amide group formation reaction, to complete the reaction, the pressure inside a reaction device can be reduced at the final stage of the reaction as necessary. In addition, a non-reactive solvent can be used to dilute as necessary. Furthermore, a tertiary amine, such as pyridine, picoline, lutidine, or trialkylamine, can be added.

The amide group moiety formed by the reaction between the component (A) and the component (B) has high cohesive force, and thus the cured resin layer formed using the epoxy resin curing agent that is the reaction product obtained from the reaction between the component (A) and the component (B) exhibits high gas barrier properties and good adhesiveness.

The reaction molar ratio of the component (B) to the component (A), [(B)/(A)], is preferably in a range from 0.3 to 1.0. When the reaction molar ratio is 0.3 or more, a sufficient amount of the amide groups is produced in the epoxy resin curing agent, and high levels of gas barrier properties and adhesiveness are exhibited. On the other hand, when the reaction molar ratio is in a range of 1.0 or less, the amount of amino groups necessary for reaction with the epoxy groups in the epoxy resin is sufficient, and excellent heat resistance and excellent solubility in organic solvents and water are exhibited.

When consideration is given particularly to the high gas-barrier properties and excellent coating film performance of the epoxy resin cured product that is to be obtained, the reaction molar ratio [(B)/(A)] of the component (B) to the component (A) is more preferably in a range from 0.6 to 1.0.

The amine-based curing agent may also be a reaction product of the components (A) and (B), and at least one compound selected from the group consisting of the following components (C), (D) and (E).

(C) At least one component selected from the group consisting of monovalent carboxylic acids represented by $R^3$—COOH and derivatives thereof (where $R^3$ represents a hydrogen atom, an alkyl group having from 1 to 7 carbons and which may have a hydroxyl group, or an aryl group having from 6 to 12 carbons)
(D) A cyclic carbonate
(E) A mono-epoxy compound having from 2 to 20 carbons The component (C), which is a monovalent carboxylic acid represented by $R^3$—COOH or a derivative thereof, is used as necessary from the viewpoints of reducing the reactivity between the epoxy resin curing agent and the epoxy resin and improving workability.

$R^3$ represents a hydrogen atom, an alkyl group having from 1 to 7 carbons and which may have a hydroxyl group, or an aryl group having from 6 to 12 carbons, and $R^3$ is preferably an alkyl group having from 1 to 3 carbons or a phenyl group.

Examples of derivatives of the monovalent carboxylic acid represented by $R^3$—COOH include esters, amides, acid anhydrides, and acid chlorides of the carboxylic acid. The ester of the carboxylic acid is preferably an alkyl ester, and the number of carbons of the alkyl is preferably from 1 to 6, more preferably from 1 to 3, and even more preferably 1 or 2.

Examples of the component (C) include monovalent carboxylic acids such as formic acid, acetic acid, propionic acid, butyric acid, lactic acid, glycolic acid, and benzoic acid, and derivatives thereof.

For the component (C), one may be used alone, or two or more may be used in combination.

The cyclic carbonate of the component (D) is used as necessary, from the viewpoints of reducing the reactivity between the epoxy resin curing agent and the epoxy resin and improving workability, and is preferably a cyclic carbonate of a six-membered ring or less from the viewpoint of reactivity with the component (A). Examples include ethylene carbonate, propylene carbonate, glycerin carbonate, 1,2-butylene carbonate, vinylene carbonate, 4-vinyl-1,3-dioxolan-2-one, 4-methoxymethyl-1,3-dioxolan-2-one, and 1,3-dioxan-2-one. Among these, from the viewpoint of gas barrier properties, at least one selected from the group consisting of ethylene carbonate, propylene carbonate, and glycerin carbonate is preferable.

For the component (D), one may be used alone, or two or more may be used in combination.

The mono-epoxy compound, which is the component (E), is a mono-epoxy compound having from 2 to 20 carbons, and is used as necessary, from the viewpoints of reducing the reactivity between the epoxy resin curing agent and the epoxy resin and improving workability. From the viewpoint of gas barrier properties, the component (E) is preferably a mono-epoxy compound having from 2 to 10 carbons and is more preferably a compound represented by Formula (2) below:

[Chem. 4]

(2)

in Formula (2), $R^4$ represents a hydrogen atom, an alkyl group having from 1 to 8 carbons, an aryl group, or $R^5$—O—$CH_2$—, and $R^5$ represents a phenyl group or a benzyl group.

Examples of the mono-epoxy compound represented by Formula (2) include ethylene oxide, propylene oxide, 1,2-butylene oxide, styrene oxide, phenylglycidyl ether, and benzylglycidyl ether. For the component (E), one may be used alone, or two or more may be used in combination.

For a case in which the component (C), (D), or (E) is used in the amine-based curing agent, any one compound selected from the group consisting of the components (C), (D), and (E) may be used alone, or a combination of two or more may be used.

Note that the amine-based curing agent may be a reaction product that is obtained by reacting, in addition to the components (A) to (E), another component within a scope that does not hinder the effect of the present invention. Examples of the other component referred to here include aromatic dicarboxylic acids or derivatives thereof.

However, the usage amount of the "other component" is preferably 30 mass % or less, more preferably 10 mass % or less, and even more preferably 5 mass % or less of the total amount of the reaction components constituting the amine-based curing agent.

The reaction product of the components (A) and (B) and the at least one compound selected from the group consisting of the components (C), (D), and (E) is obtained by using at least one compound selected from the group consisting of the components (C), (D), and (E) in combination with the component (B) and reacting this combination with the component (A), which is a polyamine compound. The reaction may be performed by adding the components (B) to (E) in any order and reacting with the component (A), or by mixing the components (B) to (E) and then reacting the mixture with the component (A).

The reaction between the component (A) and the component (C) can be carried out under the same conditions as those of the reaction between the component (A) and the component (B). In a case where the component (C) is used, the components (B) and (C) may be mixed and then reacted with the component (A), or the components (A) and (B) may be first reacted and then further reacted with the component (C).

On the other hand, in a case in which the component (D) and/or the component (E) is used, preferably, the components (A) and (B) are first reacted, and then further reacted with the component (D) and/or the component (E).

The reaction between the component (A) and the component (D) and/or the component (E) is carried out by mixing the component (A) and the component (D) and/or the component (E) at a temperature of from 25 to 200° C., and then implementing an addition reaction at a temperature of from 30 to 180° C. and preferably from 40 to 170° C. Furthermore, as necessary, a catalyst such as sodium methoxide, sodium ethoxide, and potassium t-butoxide can be used.

When the reaction is to be carried out, as necessary, the component (D) and/or the component (E) may be melted or diluted with a non-reactive solvent and used in order to facilitate the reaction.

Even for a case in which the amine-based curing agent is a reaction product of the components (A) and (B), and at least one compound selected from the group consisting of the components (C), (D), and (E), the reaction molar ratio [(B)/(A)] of the component (B) to the component (A) is, for the same reason as described above, preferably in a range from 0.3 to 1.0, and more preferably in a range from 0.6 to 1.0. Meanwhile, the reaction molar ratio [{(C)+(D)+(E)}/(A)] of the components (C), (D), and (E) to the component (A) is preferably in a range from 0.05 to 3.1, more preferably in a range from 0.07 to 2.5, and even more preferably in a range from 0.1 to 2.0.

However, from the viewpoints of the gas-barrier properties and coating performance, the reaction molar ratio [{(B)+(C)+(D)+(E)}/(A)] of the components (B) to (E) to the component (A) is preferably in a range from 0.35 to 2.5 and more preferably in a range from 0.35 to 2.0.

Amine-Based Curing Agent (ii)

The amine-based curing agent (ii) is a reaction product between epichlorohydrin and at least one selected from the group consisting of meta-xylylenediamine and para-xylylenediamine The amine-based curing agent (ii) preferably contains a compound represented by Formula (3) below as a main component. Here, "main component" refers to a component having a content of 50 mass % or more when the total constituent components in the amine-based curing agent (ii) is 100 mass %.

[Chem. 5]

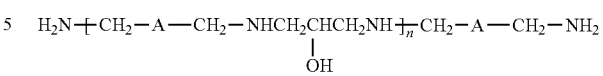

(3)

where in Formula (3), A represent a 1,3-phenylene group or a 1,4-phenylene group, and n is a number of 1 to 12. A is more preferably a 1,3-phenylene group.

The content of the compound represented by Formula (3) above in the amine-based curing agent (ii) is preferably 60 mass % or more, more preferably 70 mass % or more, even more preferably 75 mass % or more, and yet even more preferably 85 mass % or more. Furthermore, the upper limit is 100 mass %.

From the viewpoint of obtaining excellent curing performance as a curing agent, it is preferable that the proportion of a compound for which n=1 from among the compounds represented by Formula (3) above is high. In the amine-based curing agent (ii), the content of the compound represented by Formula (3) above and for which n=1 is preferably 15 mass % or more, and more preferably 20 mass % or more. Furthermore, the upper limit is 100 mass %.

The content of the compound represented by Formula (3) above in the amine-based curing agent (ii) and the composition of the compound represented by Formula (3) above can be determined by GC analysis and gel permeation chromatography (GPC) analysis.

The amine-based curing agent (ii) is obtained by subjecting epichlorohydrin and at least one type of compound (hereinafter, also referred to as a "raw material diamine") selected from the group consisting of meta-xylylenediamine and para-xylylenediamine to an addition reaction.

The addition reaction between epichlorohydrin and the raw material diamine can be carried out by a known method, and the method thereof is not particularly limited, but from the viewpoint of reaction efficiency, the reaction is preferably carried out in the presence of a basic catalyst. The basic catalyst is preferably an alkali metal hydroxide, more preferably one or more types selected from the group consisting of potassium hydroxide and sodium hydroxide, and is even more preferably sodium hydroxide.

From the viewpoint of obtaining, with high selectivity, a compound for which n=1 among the aforementioned compounds represented by Formula (3), the amount of epichlorohydrin and the raw material diamine used in the addition reaction is such that the molar ratio of the raw material diamine to 1 mol of epichlorohydrin is preferably from 1.5 to 12 mol, more preferably from 1.5 to 6.0 mol, and even more preferably from 1.8 to 3.0 mol.

The epoxy resin curing agent used in the present invention may contain a curing agent component other than an amine-based curing agent, but from the viewpoint of obtaining high gas barrier properties, the content of the amine-based curing agent is preferably high. From the viewpoint of obtaining high gas barrier properties, the content of the amine-based curing agent in the epoxy resin curing agent is preferably 50 mass % or more, more preferably 70 mass % or more, even more preferably 80 mass % or more, and yet even more preferably 90 mass % or more. Furthermore, the upper limit is 100 mass %.

The compounding ratio of the epoxy resin and the epoxy resin curing agent in the epoxy resin composition may be within the standard compounding range that is ordinarily used for a case in which an epoxy resin reaction product is produced through a reaction between an epoxy resin and an epoxy resin curing agent. Specifically, the ratio of (number of active amine hydrogens in the epoxy resin curing agent)/(number of epoxy groups in the epoxy resin), which is the ratio of the number of active amine hydrogens in the epoxy resin curing agent to the number of epoxy groups in the epoxy resin is preferably in a range from 0.2 to 12.0. The above ratio is more preferably in a range from 0.4 to 10.0, even more preferably in a range from 0.6 to 8.0, yet even more preferably more than 1.0 and 5.0 or less, and particularly preferably in a range from 1.1 to 3.5.

Acidic Compound

The acidic compound used in the epoxy resin composition of the present invention is not particularly limited as long as it is an acid compound having a proton-releasing group. Examples of the acidic compound include at least one selected from the group consisting of sulfonic acid compounds, carboxylic acid compounds, and phosphoric acid compounds. These acidic compounds may be organic acids or inorganic acids, but organic acids are preferable, at least one selected from the group consisting of sulfonic acid compounds and carboxylic acid compounds is more preferable, and carboxylic acid compounds are even more preferable. Furthermore, the acidic compound may be a hydrate.

The acid value of the acidic compound is preferably from 120 to 1300 mgKOH/g, more preferably from 150 to 800 mgKOH/g, and even more preferably from 200 to 650 mgKOH/g. From the viewpoint of maintaining high gas barrier properties of the obtained cured product, the content of the acidic compound in the epoxy resin composition is preferably low. From this viewpoint, if the acid value of the acidic compound is 120 mgKOH/g or more, the usage amount of the acidic compound required to improve adhesiveness can be reduced, and furthermore, high gas barrier properties are easily maintained in the obtained cured product. In addition, if the acid value of the acidic compound is 1300 mgKOH/g or less, volatilization and the like of the acidic compound can be suppressed, and preparation of the epoxy resin composition is facilitated.

Furthermore, from the viewpoint of miscibility with the amine in the epoxy resin composition, the acidic compound is preferably a monovalent acid.

Also, from the viewpoint of applying the epoxy resin composition to a gas barrier packaging material for a pharmaceutical product, a food product, or the like, the acidic compound used in the present invention is preferably at least one selected from the group consisting of p-toluenesulfonic acid, dodecylbenzene sulfonic acid, lactic acid, salicylic acid, 2-acrylamido-2-methylpropane sulfonic acid, and phosphoric acid.

From the viewpoint of improving adhesion of the obtained cured product to an inorganic substance and maintaining high gas barrier properties, the acidic compound is more preferably at least one selected from the group consisting of p-toluenesulfonic acid, lactic acid, and salicylic acid, and from the viewpoint of a high level of safety, lactic acid is even more preferable.

The content of the acidic compound in the epoxy resin composition of the present invention is not particularly limited as long as the ratio (basic nitrogen/acid group) of the molar equivalent of basic nitrogen in the epoxy resin composition to the molar equivalent of acid groups derived from the acidic compound is in a range from 0.10 to 3.0, but with respect to 100 parts by mass of the nonvolatile content other than the acidic compound in the epoxy resin composition, the content of the acidic compound is preferably from 20 to 120 parts by mass, more preferably from 25 to 120 parts by mass, even more preferably from 30 to 120 parts by mass, yet even more preferably from 35 to 100 parts by mass, still even more preferably from 40 to 100 parts by mass, and even further preferably from 50 to 90 parts by mass. If the content of the acidic compound is within the range described above, adhesion of the obtained cured product to an inorganic substance can be improved. Furthermore, high gas barrier properties can be maintained if the content of the acidic compound is 120 parts by mass or less per 100 parts by mass of the nonvolatile content other than the acidic compound in the epoxy resin composition. Moreover, mixing with the epoxy resin composition is facilitated, and elution or the like of the acidic compound can be suppressed.

Non-Spherical Inorganic Particles

The epoxy resin composition of the present invention can further contain non-spherical inorganic particles. By configuring the epoxy resin composition of the present invention to contain non-spherical inorganic particles, an effect of suppressing blocking can be obtained when the epoxy resin composition is used in the formation of a cured resin layer of a gas barrier film to be described later, and gas barrier properties and bending resistance of the gas barrier film can be improved.

The shape of the non-spherical inorganic particle is any three-dimensional shape other than spherical shape (substantially true spherical shape), and examples include plate shape, scale shape, column shape, chain shape, and fibrous shape. A plurality of plate-shaped or scale-shaped inorganic particles may be laminated in a layer. Among them, in terms of improving gas barrier properties and bending resistance, the inorganic particle is preferably a plate-shaped, scale-shaped, column-shaped, or chain-shaped inorganic particle, more preferably a plate-shaped, scale-shaped, or column-shaped inorganic particle, and even more preferably a plate-shaped or scale-shaped inorganic particle.

Examples of the inorganic substance constituting the non-spherical inorganic particle include silica, alumina, isinglass (mica), talc, aluminum, bentonite, and smectite. Among them, in terms of improving gas barrier properties and bending resistance, the inorganic substance is preferably at least one selected from the group consisting of silica, alumina, and mica, and is more preferably at least one selected from the group consisting of silica and alumina.

The non-spherical inorganic particles may be surface treated as necessary for the purpose of increasing dispersibility in the epoxy resin composition and improving the transparency of the cured product. Among them, the non-spherical inorganic particle is preferably coated with an organic-based material, and in terms of improving gas barrier properties, bending resistance, and transparency, at least one selected from the group consisting of silica and alumina coated with an organic-based material is more preferred. From the viewpoint of improving gas barrier properties and bending resistance, silica coated with an organic-based material is even more preferred, and from the viewpoint of transparency, alumina coated with an organic-based material is even more preferred.

The average particle size of the non-spherical inorganic particle is preferably from 1 to 2000 nm, more preferably from 1 to 1500 nm, even more preferably from 1 to 1000 nm, still more preferably from 1 to 800 nm, still even more preferably from 1 to 500 nm, still even more preferably from 5 to 300 nm, still even more preferably from 5 to 200 nm, still even more preferably from 5 to 100 nm, and still even more preferably from 8 to 70 nm. The non-spherical inorganic particle with an average particle size of 1 nm or more is easy to prepare, and the non-spherical inorganic particle with an average particle size of 2000 nm or less provides good gas barrier properties, good bending resistance, and good transparency. Here, the average particle size is the average particle size of the primary particle.

When the non-spherical inorganic particle is plate-shaped, scale-shaped, column-shaped, or fibrous-shaped, the aspect ratio of the non-spherical inorganic particle is preferably from 2 to 700 and more preferably from 3 to 500. With the aspect ratio of 2 or more, good gas barrier properties are easily exhibited. The average particle size and the aspect ratio of the non-spherical inorganic particle are determined, for example, by observing using a scanning electron microscope (SEM) or a transmission electron microscope (TEM) and averaging measured values at three or more points. In addition, the average particle size and the aspect ratio of the non-spherical inorganic particle present in the cured resin layer can be determined, for example, by embedding, with an epoxy resin, the gas barrier film having a cured resin layer, then ion milling the film cross-section using an ion milling device to prepare a sample for cross-sectional observation, and observing and measuring a cross-section of a cured resin layer portion of the resulting sample in the same manner as described above.

When the average particle size of the non-spherical inorganic particles is less than 100 nm and the measurement of the average particle size by the above method is difficult, the average particle size can also be measured, for example, by the BET method.

The method for producing the non-spherical inorganic particle is not particularly limited, and a well-known method can be used.

In terms of ease of preparation of the non-spherical inorganic particles, ease of blending the non-spherical inorganic particles into the epoxy resin composition, and dispersibility of the non-spherical inorganic particles therein, in the present invention, it is preferable to prepare a dispersion liquid of the non-spherical inorganic particles and blend the dispersion liquid into the resin composition. The dispersion medium of the non-spherical inorganic particle dispersion liquid is not particularly limited, and water or an organic solvent can be used. In terms of dispersibility of the non-spherical inorganic particle, the organic solvent is preferably a polar solvent. Examples include protic polar solvents, such as methanol, ethanol, 1-propanol, 2-propanol, 1-butanol, 2-butanol, 2-methoxyethanol, 2-ethoxyethanol, 2-propoxyethanol, 2-butoxyethanol, 1-methoxy-2-propanol, 1-ethoxy-2-propanol, and 1-propoxy-2-propanol; aprotic polar solvents, such as N,N-dimethylformamide, N,N-dimethylacetamide, dimethyl sulfoxide, and N-methylpyrrolidone.

In terms of dispersibility of the non-spherical inorganic particles, the dispersion medium is preferably at least one selected from the group consisting of water and a protic polar solvent, and in terms of dispersibility of the particles and miscibility of the dispersion liquid and the epoxy resin composition, the dispersion medium is more preferably a protic polar solvent and even more preferably at least one selected from the group consisting of methanol, ethanol, 1-propanol, and 2-propanol.

When non-spherical inorganic particles are used, the content of the non-spherical inorganic particles in the epoxy resin composition relative to 100 parts by mass of the total amount of the epoxy resin and the epoxy resin curing agent is preferably from 0.5 to 10.0 parts by mass, more preferably from 1.0 to 8.0 parts by mass, even more preferably from 1.5 to 7.5 parts by mass, and still more preferably from 3.0 to 7.0 parts by mass. If the content of the non-spherical inorganic particles in the epoxy resin composition is 0.5 parts by mass or more relative to 100 parts by mass of the total amount of the epoxy resin and the epoxy resin curing agent, the effects of improving the gas barrier properties and bending resistance of the gas barrier film obtained using the epoxy resin composition are favorable. Furthermore, when the content thereof is 10.0 parts by mass or less, the transparency of the obtained gas barrier film is also favorable.

As necessary, the epoxy resin composition may contain an additive, such as a thermosetting resin, a wetting agent, a tackifier, a coupling agent, an antifoaming agent, a curing accelerator, a rustproofing additive, a pigment, and an oxygen scavenger within a range that does not impair the effects of the present invention.

Of the additives, examples of the coupling agent include silane coupling agents, titanate-based coupling agents, and aluminate-based coupling agents, and from the viewpoint of improving adhesion of the obtained cured product to an inorganic thin film layer, a silane coupling agent is preferable.

Examples of the silane coupling agent include a silane coupling agent having a vinyl group, a silane coupling agent having an amino group, a silane coupling agent having an epoxy group, a silane coupling agent having a (meth)acryl group, and a silane coupling agent having a mercapto group. Among these, in terms of adhesion of the obtained cured product to an inorganic thin film layer, the silane coupling agent is preferably one selected from the group consisting of a silane coupling agent having an amino group and a silane coupling agent having an epoxy group.

Examples of the silane coupling agent having an amino group include 3-aminopropyltrimethoxysilane, 3-aminopropylmethyldimethoxysilane, 3-aminopropyltriethoxysilane, 3-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, N-phenyl-3-aminopropyltrimethoxysilane, and N-phenyl-3-aminopropylmethyldimethoxysilane, and one can be used, or two or more can be combined and used.

Examples of the silane coupling agent having an epoxy group include 3-glycidyloxypropyltrimethoxysilane, 3-glycidyloxypropyltriethoxysilane, 3-glycidyloxypropylmethyldimethoxysilane, 3-glycidyloxypropylmethyldiethoxysilane, and 2-(3,4-epoxycyclohexyl)ethyltrimethoxysilane, and one can be used, or two or more can be combined and used.

Note that when a silane coupling agent having an amino group is used, the amino group is also included in the calculation of the "molar equivalent of basic nitrogen in the epoxy resin composition".

The total content of these additives in the epoxy resin composition relative to 100 parts by mass of the total amount of the epoxy resin and the epoxy resin curing agent is preferably 20.0 parts by mass or less and more preferably from 0.001 to 15.0 parts by mass.

In terms of obtaining the effects of the present invention, the total content of the epoxy resin, the epoxy resin curing agent, and the acidic compound in the solid content of the epoxy resin composition is preferably 60 mass % or more, more preferably 70 mass % or more, even more preferably 80 mass % or more, and yet even more preferably 85 mass % or more, and the upper limit is 100 mass %. The "solid content of the epoxy resin composition" means components excluding the water and organic solvent in the epoxy resin composition.

The organic solvent used in the epoxy resin composition is preferably a non-reactive solvent. In addition to the polar solvent exemplified as the dispersion medium used in the dispersion liquid of the non-spherical inorganic particles, ethyl acetate, butyl acetate, methyl isobutyl ketone, toluene, and the like can be used.

Preparation of the Epoxy Resin Composition

The epoxy resin composition can be prepared, for example, by blending a given amount each of the epoxy resin, the epoxy resin curing agent, the acidic compound, and the dispersion liquid of the non-spherical inorganic particles and other additives used as necessary, and the solvent, and then stirring and mixing using a well-known method and apparatus.

The order in which the components are mixed is not particularly limited, but when non-spherical inorganic particles are to be used, preferably, the dispersion liquid of non-spherical inorganic particles and the solvent component are mixed first in order to improve dispersibility of the non-spherical inorganic particles in the epoxy resin composition, after which the epoxy resin curing agent or solution thereof, the epoxy resin, and the acidic compound are added in order. This is because the dispersibility of the non-spherical inorganic particles is favorably maintained by gradually increasing the solid content concentration in the liquid containing the non-spherical inorganic particles from a low concentration state.

The cured product of the epoxy resin composition of the present invention has excellent gas barrier properties and good adhesion to inorganic substances such as alumina. For example, a cured resin layer formed of the cured product functions as a gas barrier layer having excellent gas barrier properties. Therefore, use of the epoxy resin composition of the present invention is also suitable in gas barrier packaging materials, gas barrier adhesives, and the like, in addition to the gas barrier films and laminates described below.

The method for forming the cured product by curing the epoxy resin composition of the present invention is not particularly limited, and a well-known method can be used. More specifically, one embodiment of the method is described with regard to a method for producing the gas barrier film.

Gas Barrier Film

The gas barrier film of the present invention is characterized by having a substrate for which at least one surface contains an inorganic substance (hereinafter, also referred to simply as a "substrate"), and a cured resin layer that is a cured product of the epoxy resin composition (hereinafter, also referred to simply as a "cured resin layer").

The gas barrier film of the present invention has high gas barrier properties and results in a film having high interlayer adhesion between the surface containing an inorganic substance of the substrate and the cured resin layer. The gas barrier film may be any gas barrier film having the substrate and at least one cured resin layer, but preferably has the cured resin layer on the surface of the inorganic substance side of the substrate. Materials constituting the gas barrier film of the present invention will be described below.

Substrate

The substrate constituting the gas barrier film of the present invention need only be a substrate having at least one surface constituted of an inorganic substance. From the viewpoint of gas barrier properties, examples of the inorganic substance include silicon, aluminum, magnesium, calcium, zinc, tin, nickel, titanium, zirconium, carbon, or oxides, carbides, nitrides, and oxynitrides of these. The inorganic substance is more preferably at least one selected from the group consisting of silicon oxide (silica), aluminum, and aluminum oxide (alumina), and from the viewpoint of effectively exhibiting the effects of the present invention, aluminum oxide (alumina) is even more preferable.

Examples of the substrate include a metal foil such as an aluminum foil, and a film having an inorganic thin film layer on at least one surface of a base film.

The film having an inorganic thin film layer on at least one surface of a base film is any film having at least one inorganic thin film layer, and may have two or more inorganic thin film layers. However, in terms of bending resistance of the gas barrier film and productivity, the film preferably has an inorganic thin film layer on only one surface of the base film.

Base Film

The base film is preferably a transparent plastic film. Examples include polyolefin-based films, such as those of low density polyethylene, high density polyethylene, linear low density polyethylene, and polypropylene; polyester-based films, such as those of polyethylene terephthalate, polyethylene naphthalate, and polybutylene terephthalate; polyamide-based films, such as those of nylon 6, nylon 6,6, and poly meta-xylene adipamide (N-MXD6); polyimide-based films; biodegradable films, such as those of polylactic acid; polyacrylonitrile-based films; poly(meth)acrylic-based films; polystyrene-based films; polycarbonate-based films; ethylene-vinyl acetate copolymer saponified substance (EVOH)-based films, and polyvinyl alcohol-based films. Among them, in terms of transparency, strength, and heat resistance, the base film is preferably a film selected from the group consisting of a polyolefin-based film, a polyester-based film, a polyamide-based film, and a polyimide-based film, more preferably a polyester-based film, and even more preferably a polyethylene terephthalate (PET) film.

The film may be stretched in a uniaxial direction or biaxial direction.

Inorganic Thin Film Layer

The inorganic thin film layer is provided to impart gas barrier properties to the gas barrier film, and can exhibit high gas barrier properties even when the thickness is thin. Examples of the inorganic thin film layer can include an inorganic thin film layer made from a metal foil, and an inorganic thin film layer formed by a vapor deposition method, but from the viewpoint of obtaining high transparency, the inorganic thin film layer is preferably one formed by vapor deposition.

The inorganic substance constituting the inorganic thin film layer is not particularly limited as long as it is an inorganic substance that can form a gas barrier thin film on the base film, and examples include the abovementioned silicon, aluminum, magnesium, calcium, zinc, tin, nickel, titanium, zirconium, carbon, or oxides, carbides, nitrides, and oxynitrides thereof. Among these, in terms of gas barrier properties, the inorganic substance is preferably at least one selected from the group consisting of silicon oxides (silica), aluminum, and aluminum oxides (alumina), and from the viewpoint of forming a thin film having high gas barrier properties and transparency, the inorganic substance is more preferably at least one selected from the group consisting of silicon oxides and aluminum oxides, and in terms of gas barrier properties, silicon oxides are more preferable. Meanwhile, the cured resin layer, which is a cured product of the epoxy resin composition of the present invention, exhibits good adhesion even to an inorganic thin film layer formed of an aluminum oxide for which such adhesion has been conventionally difficult to achieve. Thus, in terms of effectiveness of the effect of the present invention, the inorganic substance constituting the inorganic thin film layer is preferably an aluminum oxide. One of the inorganic substances above may be used alone, or two or more may be used in combination.

The thickness of the inorganic thin film layer is preferably 5 nm or more in terms of obtaining high gas barrier properties. In addition, in terms of transparency and bending resistance, the thickness is preferably 100 nm or less and more preferably 50 nm or less. The thickness above is a thickness per layer of the inorganic thin film layer.

The method for forming the inorganic thin film layer is not particularly limited, and as vapor deposition methods, examples include well-known vapor deposition methods including physical vapor deposition methods, such as a vacuum deposition method, a sputtering method, and an ion plating method; and chemical vapor deposition methods, such as a plasma chemical vapor deposition method, a thermal chemical vapor deposition method, and a photochemical vapor deposition method. Furthermore, the inorganic thin film layer can be formed by bonding a metal foil such as aluminum to the base film.

The thickness of the substrate is not particularly limited and can be selected, as appropriate, in accordance with the application, but in terms of gas barrier properties and strength, the thickness is preferably from 5 to 300 µm, more preferably from 5 to 100 µm, even more preferably from 8 to 50 µm, and yet even more preferably from 10 to 40 µm.

Cured Resin Layer

The cured resin layer of the gas barrier film of the present invention is a cured product of the epoxy resin composition described above. The method for curing the epoxy resin composition is not particularly limited, and curing is implemented by a known method at a temperature and concentration of the epoxy resin composition sufficient for obtaining the cured product thereof. The curing temperature can be selected, for example, in a range of from 10 to 140° C.

From the viewpoints of gas barrier properties and bending resistance, the thickness of the cured resin layer is preferably 0.1 µm or more, more preferably 0.2 µm or more, and even more preferably 0.5 µm or more. In addition, from the viewpoint of adhesion to an inorganic substance, the viewpoint of suppressing drying insufficiency, and the viewpoint of transparency of the gas barrier film, the thickness of the cured resin layer is preferably 20 µm or less, more preferably 10 µm or less, even more preferably 8.0 µm or less, still more preferably 5.0 µm or less, still even more preferably 3.5 µm or less, still further preferably 2.0 µm or less, and yet even more preferably 1.0 µm or less. The thickness above is a thickness per layer of the cured resin layer.

Layer Structure of Gas Barrier Film

The gas barrier film of the present invention may be any gas barrier film of a structure having the substrate and at least one cured resin layer. In terms of obtaining the effects of the present invention, the gas barrier film of the present invention preferably has a structure in which only one surface of the substrate is constituted of an inorganic substance, and only one cured resin layer is provided. In addition, the cured resin layer and the surface constituted of an inorganic substance of the substrate are preferably adjacent to each other.

An example of a preferred layer structure of the gas barrier film includes a structure of FIG. 1. FIG. 1 is a cross-sectional schematic view illustrating an embodiment of the gas barrier film of the present invention. A gas barrier film 100 is provided with a substrate 1 having an inorganic thin film layer 12 on one surface of a base film 11, and a cured resin layer 2 provided on a surface on the inorganic thin film layer 12 side. In FIG. 1, the inorganic thin film layer 12 and the cured resin layer 2 are adjacent to each other. In addition, as illustrated in FIG. 1, the gas barrier film of the present invention preferably has no film other than the substrate.

However, the gas barrier film of the present invention is not limited to the layer structure of FIG. 1 and may have, for example, two or more cured resin layers. In addition, for example, the gas barrier film illustrated in FIG. 1 may be structured to have a primer layer, a protective layer, or the like between the substrate 1 and the cured resin layer 2 or on the upper surface (the surface not adjacent to the substrate 1) of the cured resin layer 2.

Method for Producing Gas Barrier Film

A method for producing the gas barrier film of the present invention is not particularly limited, and a well-known method can be used. Examples of the method for producing the gas barrier film of the structure of FIG. 1 include a method of coating, at a desired thickness, the epoxy resin composition for forming a cured resin layer onto a surface of an inorganic thin film layer side of a substrate having the inorganic thin film layer formed on one surface of a base film, and then curing the epoxy resin composition to thereby form a cured resin layer.

Examples of the coating method for coating the epoxy resin composition include bar coating, Meyer bar coating, air knife coating, gravure coating, reverse gravure coating, micro gravure coating, micro reverse gravure coating, die coating, slot die coating, vacuum die coating, dip coating, spin coating, roll coating, spray coating, and coating with a brush. Among these, bar coating, roll coating, or spray coating is preferred, and gravure coating, reverse gravure coating, micro gravure coating, or micro reverse gravure coating is industrially preferred.

After the epoxy resin composition has been applied by coating, a step (drying step) of volatilizing the solvent is implemented as necessary. Conditions in the drying step can be appropriately selected, but the drying can be performed, for example, at a drying temperature of 60 to 180° C. and a drying time of 5 to 180 seconds.

After the drying step has been implemented, the epoxy resin composition is cured to form a cured resin layer. The curing temperature can be selected, for example, in a range of from 10 to 140° C., and is preferably in a range of from 10 to 80° C. The curing time can be selected, for example, in a range from 0.5 to 200 hours, and is preferably in a range from 2 to 100 hours.

Properties of Gas Barrier Film

The gas barrier film of the present invention has excellent gas barrier properties. For example, the oxygen transmission rate of the gas barrier film at 23° C. and a relative humidity of 60% varies depending on the barrier properties of the substrate that is used but is preferably 2 $cc/m^2 \cdot day \cdot atm$ or less, more preferably 1.5 $cc/m^2 \cdot day \cdot atm$ or less, and even more preferably 1 $cc/m^2 \cdot day \cdot atm$ or less.

The oxygen transmission rate of the gas barrier film is specifically determined by a method described in Examples.

Laminate

A laminate of the present invention has the gas barrier film of the present invention and a thermoplastic resin layer. Examples of a preferred structure of the laminate include a structure in which the thermoplastic resin layer is laminated on a surface of the cured resin layer side in the gas barrier film of the present invention (a surface (upper surface) of the cured resin layer 2 side in the gas barrier film 100 of FIG.

1) or on the opposite surface of the cured resin layer 2 side (a surface (lower surface) of the base film 11 side in the gas barrier film 100 of FIG. 1).

The laminate may further include an optional layer, such as a primer layer, an ink layer, an adhesive layer, a surface protective layer, or a vapor-deposited layer, laminated between the gas barrier film and the thermoplastic resin layer. In addition, the laminate of the present invention may have two or more layers each of the gas barrier film and the thermoplastic resin layer of the present invention.

For the thermoplastic resin layer, a thermoplastic resin film is preferably used. The thermoplastic resin film is preferably a transparent plastic film exemplified with regard to the base film constituting the substrate. The surface of the thermoplastic resin film may be subjected to a surface treatment, such as a flame treatment or a corona discharge treatment. In addition, as the thermoplastic resin film, a film containing an ultraviolet absorber, a colorant, or the like, or a film having a primer layer, an ink layer, a surface protective layer, a vapor-deposited layer, or the like on the surface can also be used.

The thickness of the thermoplastic resin layer is preferably from 10 to 300 μm and is more preferably from 10 to 100 μm.

Examples of a preferred layer structure of the laminate of the present invention include a structure in which the gas barrier film and the thermoplastic resin film are directly laminated and a structure in which the gas barrier film and the thermoplastic resin film are laminated with an adhesive layer interposed between these films.

Figure 2:
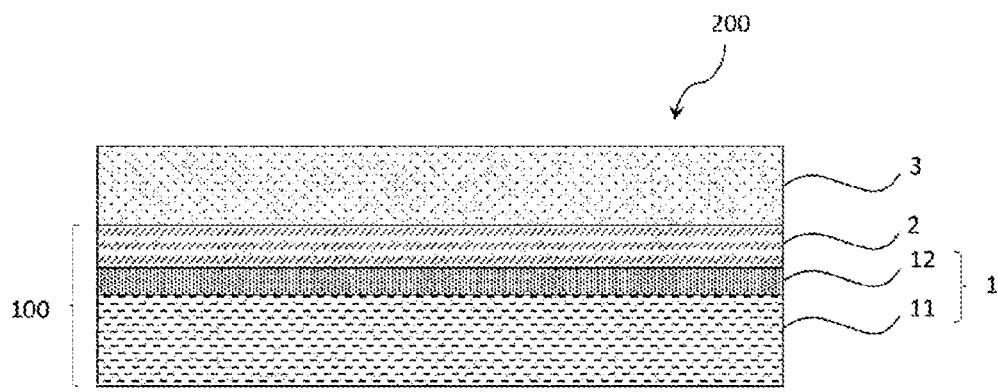
FIG. 2 is a cross-sectional schematic view illustrating a laminate according to an embodiment of the present invention.

An example of a structure in which the gas barrier film and the thermoplastic resin film are directly laminated includes a structure in which a substrate constituting the gas barrier film and the thermoplastic resin film are laminated with a cured resin layer made from the epoxy resin composition interposed therebetween (FIG. 2).

FIG. 2 is a cross-sectional schematic view illustrating an embodiment of the laminate of the present invention. In FIG. 2, a laminate 200 is formed by arranging and laminating the substrate 1 and a thermoplastic resin film 3 in a manner facing each other with the cured resin layer 2 interposed between. The laminate 200 is structured with the substrate 1 including the base film 11 and the inorganic thin film layer 12, the cured resin layer 2, and the thermoplastic resin film 3 laminated in this order.

Figure 3:
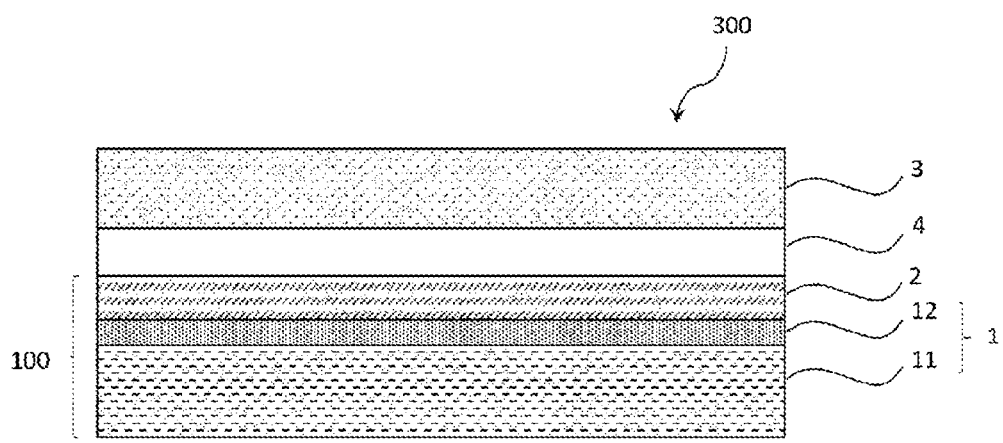
FIG. 3 is a cross-sectional schematic view illustrating a laminate according to an embodiment of the present invention.

In the case of a structure in which the gas barrier film and the thermoplastic resin film are laminated with an adhesive layer interposed between these films, these films are preferably laminated with the surface of the cured resin layer side of the gas barrier film and the thermoplastic resin film facing each other. In this case, the layer structure of the laminate is a structure illustrated in FIG. 3. FIG. 3 is a cross-sectional schematic view illustrating an embodiment of the laminate of the present invention. In FIG. 3, a laminate 300 is formed by arranging and laminating the surface of the cured resin layer 2 side of the gas barrier film 100 and the thermoplastic resin film 3 in a manner facing each other with an adhesive layer 4 interposed therebetween, and the laminate 300 is structured with the substrate 1 including the base film 11 and the inorganic thin film layer 12, the cured resin layer 2, the adhesive layer 4, and the thermoplastic resin film 3 laminated in this order.

The method for producing the laminate is not particularly limited. Examples of a method for producing a laminate in which the gas barrier film and the thermoplastic resin film are directly laminated include a method of coating the epoxy resin composition described above onto the surface containing an inorganic substance of the substrate constituting the gas barrier film, then immediately bonding the thermoplastic resin film to the coated surface using a nip roll or the like, and subsequently curing the epoxy resin composition by the method described above. In this case, the epoxy resin composition constituting the cured resin layer also functions as an adhesive layer to adhere the substrate of the gas barrier film and the thermoplastic resin film.

Examples of a method for producing a laminate in which the gas barrier film and the thermoplastic resin film are laminated with an adhesive layer interposed between these films include a method of coating an adhesive that is to constitute the adhesive layer onto one surface of the gas barrier film produced by the method described above or onto one surface of the thermoplastic resin film, and then bonding the other film to laminate the films.

As the adhesive constituting the adhesive layer, a well-known adhesive, such as a urethane-based adhesive, an acrylic-based adhesive, or an epoxy-based adhesive, can be used. In addition, the thickness of the adhesive layer is not particularly limited, but in terms of achieving both adhesion and transparency, the thickness is preferably from 0.1 to 30 μm, more preferably from 1 to 20 μm, and even more preferably from 2 to 20 μm.

Applications

The gas barrier film and laminate of the present invention are excellent in gas barrier properties and bending resistance and thus are suitable for packaging material applications for protecting food products, pharmaceuticals, cosmetics, precision electronic components, or the like. When used as a packaging material, the gas barrier film and laminate of the present invention may be used as they are as packaging materials or may be further laminated with another layer or film and used.

EXAMPLES

Next, the present invention will be described specifically with reference to examples. However, the present invention is not limited in any way by these examples.

Measurements and evaluations in the present examples were performed by the following methods.

Ratio of the Molar Equivalent of Basic Nitrogen in the Epoxy Resin Composition to the Molar Equivalent of Acid Groups Derived from the Acidic Compound (Basic Nitrogen/Acid Group)

An equivalent weight A1 (g/equivalent) of basic nitrogen of the epoxy resin used in the epoxy resin composition of each example, an equivalent weight A2 (g/equivalent) of basic nitrogen of the epoxy resin curing agent, and an equivalent weight A3 (g/equivalent) of the acid group of the acidic compound were each calculated. Next, from a compounded amount B1 (g) of the epoxy resin in the epoxy resin composition, a compounded amount B2 (g) of the epoxy resin curing agent, and a compounded amount B3 (g) of the acidic compound, (B1/A1+B2/A2) was divided by (B3/A3), and the calculated value was used as the molar equivalent ratio (basic nitrogen/acid group). Note that the calculation of the equivalent weight A2 of the basic nitrogen of the epoxy resin curing agent also included the basic nitrogen derived from additives or the like in an epoxy resin curing agent solution.

The equivalent weight A1 (g/equivalent) of the basic nitrogen of the epoxy resin and the equivalent weight A2 (g/equivalent) of the basic nitrogen of the epoxy resin curing agent were obtained by determining the total amine value (mgKOH/g) using a potentiometric titrator ("AT-610" available from Kyoto Electronic Manufacturing Co., Ltd.) and acetic acid as diluting solvent for the sample and a 0.1N perchloric acid/acetic acid solution as a titration solvent, and then calculating the equivalent weight of the basic nitrogen from the amine value. The equivalent weights thereof were calculated from the equation of (Basic nitrogen equivalent weight (g/equivalent))=1÷(total amine value×10$^{-3}$÷56.11).

pH

The pH at 25° C. was measured using a portable pH meter ("D-72LAB", available from Horiba, Ltd.). A pH electrode for low-conductivity aqueous/non-aqueous solvents ("6377-10D" available from Horiba, Ltd.) was used as the electrode.

Thickness of Cured Resin Layer

The thickness was measured using a multilayer film thickness measuring device ("DC-8200" available from Gunze Limited).

Oxygen Transmission Rate (cc/m$^2$·Day·Atm)

The oxygen transmission rates of the substrates used in each of the examples and of the gas barrier films obtained in each of the examples were measured using an oxygen transmission rate measuring device ("OX-TRAN 2/21" available from Modern Controls Inc.) at a temperature of 23° C. and a relative humidity of 60%.

Peel Strength (g/15 mm)

The peel strength at a peel rate of 300 mm/min was measured by a T-peel test in accordance with the method stipulated by JIS K6854-3:1999.

Production Example 1

Preparation of Epoxy Resin Curing Agent Solution A

A reaction vessel was charged with 1 mol of meta-xylylenediamine (MXDA). The temperature was raised to 60° C. under a nitrogen stream, and 0.93 mol of methyl acrylate was added dropwise over 1 hour. The temperature was increased to 165° C. while generated methanol was distilled off, and the temperature was then maintained at 165° C. for 2.5 hours, and thereby an amine-based curing agent was obtained. Methanol was added dropwise over 1.5 hours, after which 3-aminopropyltriethoxysilane ("KBE-903" available from Shin-Etsu Chemical Co., Ltd.), which is a silane coupling agent, was added, and an epoxy resin curing agent solution A containing 62.2 mass % of the amine curing agent, 2.8 mass % of 3-aminopropyltriethoxysilane, and 35 mass % of methanol was obtained. The equivalent weight (in terms of nonvolatile content) of the basic nitrogen of the epoxy resin curing agent solution A was 172 g/equivalent.

Production Example 2

(Preparation of Epoxy Resin Curing Agent Solution B)

An amine-based curing agent "Gaskamine 328" (available from Mitsubishi Gas Chemical Co., Inc., MXDA content: 26.7 mass %; content of compound represented by Formula (3-1) below: 73.3 mass % (n is a number of 1 to 12, and the content a compound for which n=1 is 20.9 mass %), AHEW: 55), which is a reaction product of epichlorohydrin and MXDA, was dissolved in methanol such that the solid content concentration became 10 mass %, and an epoxy resin curing agent B was obtained. The equivalent weight (in terms of nonvolatile content) of the basic nitrogen of the epoxy resin curing agent solution B was 84 g/equivalent.

[Chem. 6]

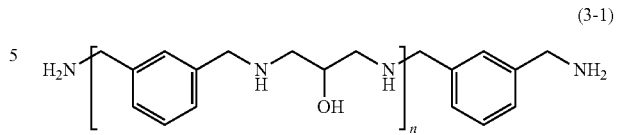

(3-1)

Example 1

Preparation of an Epoxy Resin Composition

Amounts of 33.2 g of methanol and 4.87 g of ethyl acetate, as a diluting solvent, and 1.4 g of a dispersion liquid of plate-shaped alumina particles coated with an organic-based coating ("KOS-A2EOK5-10" available from Kawaken Fine Chemicals Co., Ltd., an ethanol dispersion liquid, solid content concentration: 10 mass %, an average primary particle size of the alumina particles: 20 nm) were added, and the mixture was stirred well. Next, 3.18 g of the epoxy resin curing agent solution A obtained in Production Example 1 was added, and the mixture was stirred. Here, an epoxy resin composition was prepared by adding and stirring 1 g of an epoxy resin ("TETRAD-X" available from Mitsubishi Gas Chemical Co., Inc.) having a glycidylamino group derived from meta-xylylenediamine ((number of active amine hydrogens in the epoxy resin curing agent)/(number of epoxy groups in the epoxy resin)=1.2) as an epoxy resin and 1.28 g of p-toluenesulfonic acid monohydrate (acid value: 294 mgKOH/g) as an acidic compound. The compounded amount of the p-toluenesulfonic acid monohydrate per 100 parts by mass of nonvolatile content other than the p-toluenesulfonic acid monohydrate in the epoxy resin composition was 40 parts by mass.

Preparation and Evaluation of Gas Barrier Film and Laminate

A bar coater No. 3 was used to coat the obtained epoxy resin composition onto an alumina vapor deposited surface of an alumina vapor deposited PET (Barrialox 1011HG (no coating) available from Toray Advanced Film Co., Ltd., thickness: 12 μm, oxygen transmission rate: 2.2 cc/(m$^2$·day·atm)) having an aluminum oxide (alumina) vapor deposited on one surface of PET. The epoxy resin composition was heated and dried for 60 seconds at 120° C. (thickness after drying: approximately 0.5 μm), and then cured by heating for two days at 40° C., and a gas barrier film made from a substrate and a cured resin layer was produced.

A urethane adhesive ("TOMOFLEX AD-502" available from Toyo-Morton, Ltd.) was coated onto the surface of this cured resin layer using a bar coater No. 12 and dried at 80° C. for 10 seconds, and an adhesive layer was formed (thickness after drying: approximately 3 μm). The urethane adhesive used was prepared by adding 1.05 g of a curing agent CAT-RT85 and 16.9 g of ethyl acetate as a solvent to 15 g of a primary agent AD-502 and stirring the mixture well. A polypropylene film ("P1146" available from Toyobo Co., Ltd.) having a thickness of 50 μm was bonded on the adhesive layer using a nip roll, and heated for two days at 40° C., and a laminate with the structure of FIG. 3 was obtained.

This laminate was then used, and the peel strength was measured by the method described above. The results are shown in Table 1.

Example 2

An epoxy resin composition was prepared by the same method as Example 1 with the exception that the compounded amount of the methanol in Example 1 was changed to 35.9 g, and the compounded amount of the p-toluenesulfonic acid monohydrate was changed to 1.60 g. In addition, a gas barrier film and a laminate were prepared, and the peel strength was measured. The results are shown in Table 1.

Example 3

An epoxy resin composition was prepared by the same method as Example 1 with the exception that the compounded amount of the methanol in Example 1 was changed to 41.9 g, and the compounded amount of the p-toluenesulfonic acid monohydrate was changed to 2.24 g. In addition, a gas barrier film and a laminate were prepared, and the peel strength was measured. The results are shown in Table 1.

Comparative Example 1

An epoxy resin composition was prepared by the same method as Example 1 with the exception that the compounded amount of the methanol in Example 1 was changed to 21.6 g, and p-toluenesulfonic acid monohydrate was not added. In addition, a gas barrier film and a laminate were prepared, and the peel strength was measured. The results are shown in Table 1.

Comparative Example 2

An epoxy resin composition was prepared by the same method as Example 1 with the exception that the compounded amount of the methanol in Example 1 was changed to 24.4 g, and the compounded amount of the p-toluenesulfonic acid monohydrate was changed to 0.32 g. In addition, a gas barrier film and a laminate were prepared, and the peel strength was measured. The results are shown in Table 1.

Comparative Example 3

An epoxy resin composition was prepared by the same method as Example 1 with the exception that the compounded amount of the methanol in Example 1 was changed to 27.4 g, and the compounded amount of the p-toluenesulfonic acid monohydrate was changed to 0.64 g. In addition, a gas barrier film and a laminate were prepared, and the peel strength was measured. The results are shown in Table 1.

Comparative Example 4

An epoxy resin composition was prepared by the same method as Example 1 with the exception that the compounded amount of the methanol in Example 1 was changed to 30.2 g, and the compounded amount of the p-toluenesulfonic acid monohydrate was changed to 0.96 g. In addition, a gas barrier film and a laminate were prepared, and the peel strength was measured. The results are shown in Table 1.

Example 4

An epoxy resin composition was prepared by the same method as Example 1 with the exception that 1.28 g (1.15 g as an active amount) of a lactic acid (LA, acid value of 622 mgKOH/g) aqueous solution ("Lactic Acid 90F" available from Musashino Chemical Laboratory, Ltd., solid content concentration: 90 mass %) was compounded as an acidic compound in place of the p-toluenesulfonic acid monohydrate in Example 1, and the compounded amount of methanol was changed to 29.5 g. In addition, a gas barrier film and a laminate were prepared, and the peel strength was measured. The results are shown in Table 1.

Example 5

An epoxy resin composition was prepared by the same method as Example 4 with the exception that the compounded amount of the methanol in Example 4 was changed to 32.0 g, and the compounded amount of the lactic acid aqueous solution was changed to 1.60 g. In addition, a gas barrier film and a laminate were prepared, and the peel strength was measured. The results are shown in Table 1.

Example 6

An epoxy resin composition was prepared by the same method as Example 4 with the exception that the compounded amount of the methanol in Example 4 was changed to 36.9 g, and the compounded amount of the lactic acid aqueous solution was changed to 1.93 g. In addition, a gas barrier film and a laminate were prepared, and the peel strength was measured. The results are shown in Table 1.

Example 7

An epoxy resin composition was prepared by the same method as Example 4 with the exception that the compounded amount of the methanol in Example 4 was changed to 41.9 g, and the compounded amount of the lactic acid aqueous solution was changed to 2.57 g. In addition, a gas barrier film and a laminate were prepared, and the peel strength was measured. The results are shown in Table 1.

Example 8

An epoxy resin composition was prepared by the same method as Example 4 with the exception that the compounded amount of the methanol in Example 4 was changed to 47.4 g, and the compounded amount of the lactic acid aqueous solution was changed to 3.20 g. In addition, a gas barrier film and a laminate were prepared, and the peel strength was measured. The results are shown in Table 1.

Comparative Example 5

An epoxy resin composition was prepared by the same method as Example 4 with the exception that the compounded amount of the methanol in Example 4 was changed to 41.9 g, and the compounded amount of the lactic acid aqueous solution was changed to 0.32 g. In addition, a gas barrier film and a laminate were prepared, and the peel strength was measured. The results are shown in Table 1.

Example 9

An epoxy resin composition was prepared by the same method as Example 1 with the exception that 1.92 g of salicylic acid (SA, acid value of 406 mgKOH/g) was compounded as an acidic compound in place of the p-toluenesulfonic acid monohydrate in Example 1, and the compounded amount of methanol was changed to 38.9 g. In addition, a gas barrier film and a laminate were prepared, and the peel strength was measured. The results are shown in Table 1.

Example 10

An epoxy resin composition was prepared by the same method as Example 9 with the exception that the compounded amount of the methanol in Example 9 was changed to 44.4 g, and the compounded amount of the salicylic acid was changed to 2.56 g. In addition, a gas barrier film and a laminate were prepared, and the peel strength was measured. The results are shown in Table 1.

Example 11

An epoxy resin composition was prepared by the same method as Example 9 with the exception that the compounded amount of the methanol in Example 9 was changed to 50.4 g, and the compounded amount of the salicylic acid was changed to 3.20 g. In addition, a gas barrier film and a laminate were prepared, and the peel strength was measured. The results are shown in Table 1.

Comparative Example 6

An epoxy resin composition was prepared by the same method as Example 9 with the exception that the compounded amount of the methanol in Example 9 was changed to 24.4 g, and the compounded amount of the salicylic acid was changed to 0.32 g. In addition, a gas barrier film and a laminate were prepared, and the peel strength was measured. The results are shown in Table 1.

A peel strength improvement rate in relation to Comparative Example 1 for Examples 1 to 11 and Comparative Examples 2 to 6 is also shown in Table 1.

Example 12

Preparation of an Epoxy Resin Composition

An amount of 6.6 g of the epoxy resin curing agent solution B obtained in Production Example 2 was added to 8.9 g of methanol, which is a diluting solvent, and the mixture was stirred. Here, an epoxy resin composition was prepared by adding and stirring 0.99 g of an epoxy resin ("TETRAD-X" available from Mitsubishi Gas Chemical Co., Inc.) having a glycidylamino group derived from meta-xylylenediamine ((number of active amine hydrogens in the epoxy resin curing agent)/(number of epoxy groups in the epoxy resin)=1.2) as an epoxy resin and 0.99 g (0.89 g as an active amount) of a lactic acid (LA) aqueous solution ("Lactic Acid 90F" available from Musashino Chemical Laboratory, Ltd., solid content concentration: 90 mass %) as an acidic compound.

Preparation and Evaluation of Gas Barrier Film and Laminate

A gas barrier film and a laminate were prepared by the same method as in Example 1 with the exception that the epoxy resin composition obtained as described above was used, and the peel strength was measured. The results are shown in Table 1.

Examples 13 and 14 and Comparative Example 7 to 9

Epoxy resin compositions were prepared by the same method as Example 12 with the exception that the compounded amount of the lactic acid aqueous solution in Example 12 was changed such that the active amount of lactic acid was the amount shown in Table 1. In addition, gas barrier films and laminates were prepared, and the peel strength was measured. The results are shown in Table 1.

The percentage of improvement in peel strength in relation to Comparative Example 7 is also shown in Table 1 for Examples 12 to 14 and Comparative Examples 8 and 9.

Example 15

An epoxy resin composition was prepared by the same method as Example 4 with the exception that the compounded amount of the methanol in Example 4 was changed to 28.9 g, the compounded amount of the epoxy resin ("TETRAD-X" available from Mitsubishi Gas Chemical Co., Inc.) was changed to 0.4 g ((number of active amine hydrogens in the epoxy resin curing agent)/(number of epoxy groups in the epoxy resin)=3.0), and the compounded amount of the lactic acid aqueous solution was changed to 1.57 g (1.41 g as an active amount). In addition, a gas barrier film and a laminate were prepared, and the peel strength was measured. The results are shown in Table 1.

Example 16

An epoxy resin composition was prepared by the same method as Example 15 with the exception that the compounded amount of the methanol in Example 15 was changed to 32.9 g, and the compounded amount of the lactic acid aqueous solution was changed to 2.08 g. In addition, a gas barrier film and a laminate were prepared, and the peel strength was measured. The results are shown in Table 1.

Example 17

An epoxy resin composition was prepared by the same method as Example 15 with the exception that the compounded amount of the methanol in Example 15 was changed to 37.1 g, and the compounded amount of the lactic acid aqueous solution was changed to 2.61 g. In addition, a gas barrier film and a laminate were prepared, and the peel strength was measured. The results are shown in Table 1.

Comparative Example 10

An epoxy resin composition was prepared by the same method as Example 15 with the exception that the compounded amount of the methanol in Example 15 was changed to 16.2 g, and a lactic acid aqueous solution was not added. In addition, a gas barrier film and a laminate were prepared, and the peel strength was measured. The results are shown in Table 1.

Comparative Example 11

An epoxy resin composition was prepared by the same method as Example 15 with the exception that the compounded amount of the methanol in Example 15 was changed to 18.4 g, and the compounded amount of the lactic acid aqueous solution was changed to 0.26 g. In addition, a gas barrier film and a laminate were prepared, and the peel strength was measured. The results are shown in Table 1.

A peel strength improvement rate in relation to Comparative Example 10 for Examples 15 to 17 and Comparative Example 11 is also shown in Table 1.

TABLE 1

| | | Epoxy Resin Composition | | | | | | | | | Evaluation of Gas Barrier Film | | |
|---|---|---|---|---|---|---|---|---|---|---|---|---|---|
| | | | Number of active amine hydrogens in curinig agent/ Number of epoxy groups in epoxy resin | Acidic Compound | | Plate-shaped alumina particle | Silane Coupling Agent | | Molar Equivalent Ratio | | Peel Strength | Peel Strength Improvement Rate *3) % | Oxygen transmission rate *4) cc/m² · day · atm |
| | Substrate Type | Epoxy resin | Resin Curing Agent Solution | | Type | parts by mass *1) | parts by mass *2) | parts by mass *2) | pH | (basic nitrogen/ acid group) | Peel Strength g/15 mm | | |
| Example 1 | Alumina vapor-deposited PET | TETRAD-X | A | 1.2 | pTsOH•H₂O | 40 | 5 | 3 | 7.2 | 2.60 | 255 | 145.7 | — |
| Example 2 | Alumina vapor-deposited PET | TETRAD-X | A | 1.2 | pTsOH•H₂O | 50 | 5 | 3 | 6.8 | 2.00 | 385 | 220.0 | 0.75 |
| Example 3 | Alumina vapor-deposited PET | TETRAD-X | A | 1.2 | pTsOH•H₂O | 70 | 5 | 3 | 6.0 | 1.50 | 980 | 560.0 | — |
| Comparative Example 1 | Alumina vapor-deposited PET | TETRAD-X | A | 1.2 | — | — | 5 | 3 | 10.0 | — | 175 | — | 0.2 |
| Comparative Example 2 | Alumina vapor-deposited PET | TETRAD-X | A | 1.2 | pTsOH•H₂O | 10 | 5 | 3 | 9.1 | 10.20 | 215 | 122.9 | 0.5 |
| Comparative Example 3 | Alumina vapor-deposited PET | TETRAD-X | A | 1.2 | pTsOH•H₂O | 20 | 5 | 3 | 8.2 | 5.10 | 200 | 114.3 | — |
| Comparative Example 4 | Alumina vapor-deposited PET | TETRAD-X | A | 1.2 | pTsOH•H₂O | 30 | 5 | 3 | 7.5 | 3.40 | 215 | 122.9 | — |
| Example 4 | Alumina vapor-deposited PET | TETRAD-X | A | 1.2 | LA | 36 | 5 | 3 | 6.5 | 1.34 | 310 | 177.1 | 0.65 |
| Example 5 | Alumina vapor-deposited PET | TETRAD-X | A | 1.2 | LA | 45 | 5 | 3 | 6.1 | 1.07 | 350 | 200.0 | — |
| Example 6 | Alumina vapor-deposited PET | TETRAD-X | A | 1.2 | LA | 54 | 5 | 3 | 5.7 | 0.90 | 475 | 271.4 | — |
| Example 7 | Alumina vapor-deposited PET | TETRAD-X | A | 1.2 | LA | 72 | 5 | 3 | 5.5 | 0.67 | 550 | 314.3 | — |
| Example 8 | Alumina vapor-deposited PET | TETRAD-X | A | 1.2 | LA | 90 | 5 | 3 | 5.3 | 0.54 | 360 | 205.7 | — |
| Comparative Example 5 | Alumina vapor-deposited PET | TETRAD-X | A | 1.2 | LA | 9 | 5 | 3 | 8.9 | 5.37 | 225 | 128.6 | — |
| Example 9 | Alumina vapor-deposited PET | TETRAD-X | A | 1.2 | SA | 60 | 5 | 3 | 5.3 | 1.24 | 395 | 225.7 | — |
| Example 10 | Alumina vapor-deposited PET | TETRAD-X | A | 1.2 | SA | 80 | 5 | 3 | 5.0 | 0.93 | 525 | 300.0 | — |

TABLE 1-continued

| | | | Epoxy Resin Composition | | | | | | | Evaluation of Gas Barrier Film | | |
|---|---|---|---|---|---|---|---|---|---|---|---|---|
| | Substrate Type | Epoxy resin | Epoxy Resin Curing Agent Solution | Number of active amine hydrogens in curinig agent/ Number of epoxy groups in epoxy resin | Acidic Compound Type | Acidic Compound parts by mass *1) | Plate-shaped alumina particle parts by mass *2) | Silane Coupling Agent parts by mass *2) | pH | Molar Equivalent Ratio (basic nitrogen/ acid group) | Peel Strength g/15 mm | Peel Strength Improvement Rate *3) % | Oxygen transmission rate *4) cc/m² · day · atm |
| Example 11 | Alumina vapor-deposited PET | TETRAD-X | A | 1.2 | SA | 100 | 5 | 3 | 4.5 | 0.74 | 480 | 274.3 | — |
| Comparative Example 6 | Alumina vapor-deposited PET | TETRAD-X | A | 1.2 | SA | 10 | 5 | 3 | 9.0 | 7.42 | 165 | 94.3 | 0.4 |
| Example 12 | Alumina vapor-deposited PET | TETRAD-X | B | 1.2 | LA | 54 | 0 | 0 | 6.3 | 1.69 | 375 | 214.3 | 0.67 |
| Example 13 | Alumina vapor-deposited PET | TETRAD-X | B | 1.2 | LA | 72 | 0 | 0 | 5.7 | 1.27 | 450 | 257.1 | — |
| Example 14 | Alumina vapor-deposited PET | TETRAD-X | B | 1.2 | LA | 90 | 0 | 0 | 5.4 | 1.01 | 440 | 251.4 | 0.85 |
| Comparative Example 7 | Alumina vapor-deposited PET | TETRAD-X | B | 1.2 | — | — | 0 | 0 | 11.1 | — | 175 | — | — |
| Comparative Example 8 | Alumina vapor-deposited PET | TETRAD-X | B | 1.2 | LA | 9 | 0 | 0 | 9.5 | 10.13 | 50 | 28.6 | 0.45 |
| Comparative Example 9 | Alumina vapor-deposited PET | TETRAD-X | B | 1.2 | LA | 27 | 0 | 0 | 8.2 | 3.38 | 50 | 28.6 | — |
| Example 15 | Alumina vapor-deposited PET | TETRAD-X | A | 3.0 | LA | 54 | 6.3 | 3.7 | 6.0 | 0.74 | 300 | 133.3 | — |
| Example 16 | Alumina vapor-deposited PET | TETRAD-X | A | 3.0 | LA | 72 | 6.3 | 3.7 | 5.6 | 0.55 | 700 | 311.1 | — |
| Example 17 | Alumina vapor-deposited PET | TETRAD-X | A | 3.0 | LA | 90 | 6.3 | 3.7 | 5.4 | 0.44 | 410 | 182.2 | — |
| Comparative Example 10 | Alumina vapor-deposited PET | TETRAD-X | A | 3.0 | LA | — | 6.3 | 3.7 | 10.1 | — | 225 | — | — |
| Comparative Example 11 | Alumina vapor-deposited PET | TETRAD-X | A | 3.0 | LA | 9 | 6.3 | 3.7 | 9.1 | 4.42 | 235 | 104.4 | — |

*1) Parts by mass per 100 parts by mass of nonvolatile content other than the acidic compound in the epoxy resin composition
*2) Parts by mass relative to 100 parts by mass of the total amount of the epoxy resin and the curing agent
*3) Improvement rate with respect to Comparative Example 1 for Examples 1 to 11 and Comparative Examples 2 to 6, improvement rate with respect to Comparative Example 7 for Examples 12 to 14 and Comparative Examples 8 and 9, and improvement rate with respect to Comparative Example 10 for Examples 15 to 17 and Comparative Example 11
*4) "—" indicates not measured.

Example 18

Preparation of an Epoxy Resin Composition (Adhesive)

An amount of 3.2 g of the epoxy resin curing agent solution A obtained in Production Example 1 was added to 4.6 g of methanol, which is a diluting solvent, and the mixture was stirred. Here, an epoxy resin composition was prepared by adding and stirring 1 g of an epoxy resin ("TETRAD-X" available from Mitsubishi Gas Chemical Co., Inc.) having a glycidylamino group derived from meta-xylylenediamine ((number of active amine hydrogens in the epoxy resin curing agent)/(number of epoxy groups in the epoxy resin)=1.2) as an epoxy resin and 2.46 g (2.22 g as an active amount) of a lactic acid (LA) aqueous solution ("Lactic Acid 90F" available from Musashino Chemical Laboratory, Ltd., solid content concentration: 90 mass %) as an acidic compound.

Preparation and Evaluation of Laminate

A bar coater No. 8 was used to coat the obtained epoxy resin composition onto an alumina vapor deposited surface of an alumina vapor deposited PET (Barrialox 1011HG (no coating) available from Toray Advanced Film Co., Ltd., thickness: 12 μm) having an aluminum oxide (alumina) vapor deposited on one surface of PET. The epoxy resin composition was dried by heating at 80° C. for 30 seconds (thickness after drying: approximately 3 μm). A polypropylene film ("P1146" available from Toyobo Co., Ltd.) having a thickness of 50 μm was immediately bonded thereon using a nip roll, and heated for two days at 40° C., and a laminate was obtained.

This laminate was then used, and the peel strength was measured by the method described above. The results are shown in Table 2.

Comparative Example 12

The preparation of an epoxy resin composition and the fabrication of a laminate were implemented by the same method as in Example 18 with the exception that the lactic acid aqueous solution of Example 18 was not added. The peel strength was also measured by the method described above. The results are shown in Table 2.

Example 19

An epoxy resin composition was prepared by the same method as Example 18 with the exception that the compounded amount of the epoxy resin ("TETRAD-X" available from Mitsubishi Gas Chemical Co., Inc.) in Example 18 was changed to 0.4 g ((number of active amine hydrogens in the epoxy resin curing agent)/(number of epoxy groups in the epoxy resin)=3.0), and the compounded amount of the lactic acid aqueous solution was changed to 1.98 g. In addition, a gas barrier film and a laminate were prepared, and the peel strength was measured. The results are shown in Table 2.

Comparative Example 13

The preparation of an epoxy resin composition and the fabrication of a laminate were implemented by the same method as in Example 19 with the exception that the lactic acid aqueous solution of Example 19 was not added. The peel strength was also measured by the method described above. The results are shown in Table 2.

The percentage of improvement in peel strength of Example 18 in relation to Comparative Example 12, and the percentage of improvement in peel strength of Example 19 in relation to Comparative Example 13 are also shown in Table 2.

TABLE 2

| | | Epoxy Resin Composition | | | | | | | Evaluation Laminate | |
| --- | --- | --- | --- | --- | --- | --- | --- | --- | --- | --- |
| | Substrate Type | Epoxy resin | Epoxy Resin Curing Agent Solution | Number of active amine hydrogens in curing agent/ Number of epoxy groups in epoxy resin | Acidic Compound Type | Acidic Compound parts by mass *1) | Silane Coupling Agent parts by mass *2) | pH | Molar Equivalent Ratio (basic nitrogen/ acid group) | Peel Strength g/15 mm | Peel Strength Improvement % |
| Example 18 | Alumina vapor-deposited PET | TETRAD-X | A | 1.2 | LA | 72 | 3 | 5.5 | 0.69 | 210 | 420.0 |
| Comparative Example 12 | Alumina vapor-deposited PET | TETRAD-X | A | 1.2 | — | — | 3 | 10.0 | — | 50 | — |
| Example 19 | Alumina vapor-deposited PET | TETRAD-X | A | 3.0 | LA | 72 | 3.7 | 5.6 | 0.71 | 255 | 510.0 |
| Comparative Example 13 | Alumina vapor-deposited PET | TETRAD-X | A | 3.0 | — | — | 3.7 | 10.1 | — | 50 | — |

*1) Parts by mass per 100 parts by mass of nonvolatile content other than the acidic compound in the epoxy resin composition
*2) Parts by mass relative to 100 parts by mass of the total amount of the epoxy resin and the curing agent
*3) Improvement rate with respect to Comparative Example 12 for Example 18, and improvement rate with respect to Comparative Example 13 for Example 19

INDUSTRIAL APPLICABILITY

According to the epoxy resin composition of the present invention, a cured product having high gas barrier properties, and having good adhesion to inorganic substances such as alumina in particular can be formed. A gas barrier film and laminate having a cured resin layer formed on a substrate having at least one surface constituted of an inorganic substance, the cured resin layer being a cured product of the epoxy resin composition, exhibit high gas barrier properties and interlayer adhesiveness, and are suitable for packaging material applications, for example.

REFERENCE SIGNS LIST

100 Gas barrier film
1 Substrate
11 Base film
12 Inorganic thin film layer
2 Cured resin layer
3 Thermoplastic resin film (thermoplastic resin layer)
4 Adhesive layer
200, 300 Laminate

The invention claimed is:
1. An epoxy resin composition comprising:
an epoxy resin;
an epoxy resin curing agent comprising an amine-based curing agent; and
at least one acidic compound selected from the group consisting of p-toluenesulfonic acid, dodecylbenzene sulfonic acid, lactic acid, salicylic acid, 2-acrylamido-2-methylpropane sulfonic acid, and phosphoric acid,
wherein a ratio (basic nitrogen/acid groups) of a molar equivalent of basic nitrogen in the epoxy resin composition to a molar equivalent of acid groups derived from the acidic compound is from 0.10 to 3.0 and
wherein the epoxy resin comprises, as a main component, an epoxy resin having a glycidylamino group derived from meta-xylylenediamine.
2. The epoxy resin composition according to claim 1, having a pH at 25° C. of 7.5 or less.
3. The epoxy resin composition according to claim 1, wherein the amine-based curing agent is the following amine-based curing agent (i):
(i) a reaction product between a component (A) and a component (B):
(A) at least one component selected from the group consisting of meta-xylylenediamine and para-xylylenediamine;
(B) at least one component selected from the group consisting of unsaturated carboxylic acids represented by Formula (1) and derivatives thereof;

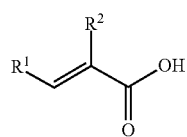
(1)

in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.
4. The epoxy resin composition according to claim 1, further comprising a non-spherical inorganic particle.

5. The epoxy resin composition according to claim 1, wherein a ratio of the number of active amine hydrogens in the epoxy resin curing agent to the number of epoxy groups in the epoxy resin is more than 1.0 and 5.0 or less.
6. A gas barrier film comprising:
a substrate having at least one surface constituted of an inorganic substance; and
a cured resin layer,
wherein the cured resin layer is a cured product of the epoxy resin composition described in claim 1.
7. The gas barrier film according to claim 6, wherein the inorganic substance constituting the substrate is at least one selected from the group consisting of silicon oxide, aluminum, and aluminum oxide.
8. The gas barrier film according to claim 6, wherein the surface of the substrate constituted of the inorganic substance is adjacent to the cured resin layer.
9. The gas barrier film according to claim 6, comprising the substrate having only one surface constituted of the inorganic substance, and only one cured resin layer.
10. A laminate comprising: the gas barrier film described in claim 6; and a thermoplastic resin layer.
11. The epoxy resin composition according to claim 1, wherein a content of the acidic compound in the epoxy resin composition is from 35 to 120 parts by mass with respect to 100 parts by mass of the nonvolatile content other than the acidic compound in the epoxy resin composition.
12. The epoxy resin composition according to claim 1, wherein the ratio (basic nitrogen/acid groups) of a molar equivalent of basic nitrogen in the epoxy resin composition to a molar equivalent of acid groups derived from the acidic compound is from 0.10 to 0.93.
13. An epoxy resin composition comprising:
an epoxy resin;
an epoxy resin curing agent comprising an amine-based curing agent; and
at least one acidic compound selected from the group consisting of p-toluenesulfonic acid, dodecylbenzene sulfonic acid, lactic acid, salicylic acid, 2-acrylamido-2-methylpropane sulfonic acid, and phosphoric acid,
wherein a ratio (basic nitrogen/acid groups) of a molar equivalent of basic nitrogen in the epoxy resin composition to a molar equivalent of acid groups derived from the acidic compound is from 0.10 to 3.0, and
wherein a ratio of the number of active amine hydrogens in the epoxy resin curing agent to the number of epoxy groups in the epoxy resin is more than 1.0 and 5.0 or less.
14. A gas barrier film comprising:
a substrate having at least one surface constituted of an inorganic substance; and
a cured resin layer,
wherein the cured resin layer is a cured product of an epoxy resin composition comprising:
an epoxy resin;
an epoxy resin curing agent comprising an amine-based curing agent; and
at least one acidic compound selected from the group consisting of p-toluenesulfonic acid, dodecylbenzene sulfonic acid, lactic acid, salicylic acid, 2-acrylamido-2-methylpropane sulfonic acid, and phosphoric acid,
wherein a ratio (basic nitrogen/acid groups) of a molar equivalent of basic nitrogen in the epoxy resin composition to a molar equivalent of acid groups derived from the acidic compound is from 0.10 to 3.0.

* * * * *